United States Patent
Sarvestani

(10) Patent No.: US 9,586,644 B2
(45) Date of Patent: *Mar. 7, 2017

(54) BICYCLE ACTIVITY MONITORING AND RECORDING DEVICE WITH AIR POLLUTION SENSORS

(71) Applicant: Seyed Amin Ghorashi Sarvestani, Keppel Bay (SG)

(72) Inventor: Seyed Amin Ghorashi Sarvestani, Keppel Bay (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/453,104

(22) Filed: Aug. 6, 2014

(65) Prior Publication Data

US 2015/0360740 A1   Dec. 17, 2015

Related U.S. Application Data

(63) Continuation-in-part of application No. 14/247,346, filed on Apr. 8, 2014.

(60) Provisional application No. 62/011,258, filed on Jun. 12, 2014.

(51) Int. Cl.
*B62K 21/26* (2006.01)
*B62J 99/00* (2009.01)

(52) U.S. Cl.
CPC ............... *B62K 21/26* (2013.01); *B62J 99/00* (2013.01); *B62J 2099/0013* (2013.01)

(58) Field of Classification Search
CPC ........................................................ B62J 6/001
USPC .......................................... 280/281; 264/129
See application file for complete search history.

(56) References Cited

U.S. PATENT DOCUMENTS 9,159,080 B2 * 10/2015 Fiorucci ............. G06Q 30/0226
2013/0144527 A1 * 6/2013 Kuhnreichi ........ G01N 33/0075
702/2

OTHER PUBLICATIONS

Arndt et al. An Autonomous Pollution Detect'ant System for Safety—and Security Services, 1998, IEEE, p. 1-6.*
Nakamura et al. Proposal of Web Framework for Ubiquitous Sensor Network and its Trial Application using NO2 Sensor Mounted on Bicycle, 2012, IEEE, p. 89-90.*
Gao, Study on the Sensor for the Pedal Push Force of Bicycle, 2009, IEEE, p. 2-977-2-980.*
Akkaya et al. C2AP: Coverage-aware and Connectivity-constrained Actor Positioning in Wireless Sensor and Actor Networks, 2007, IEEE, p. 281-288.*
Zhang et al. Water Pollution Monitoring System based on Zigbee Wireless Sensor Network, 2011, IEEE, p. 1775-1779.*
Piedrahita et al., The next generation of low-cost personal air quality sensors for quantitative exposure monitoring, 2013, Internet. p. 3325-3336.*
Synder et al., The Changing Paradigm of Air Pollution Monitoring, 2011, Internet. p. 1-24.*
Ali et al., A Mobile GPRS-Sensors Array for Air Pollution Monitoring, 2010, IEEE, p. 1666-1671.*
Brienza et al., A Cooperative Sensing System for Air Quality Monitoring in Urban Areas, 2014, IEEE, p. 1-6.*

(Continued)

*Primary Examiner* — McDieunel Marc
(74) *Attorney, Agent, or Firm* — Emerson Thomson Bennett, LLC

(57) ABSTRACT

Provided is an activity monitoring and recording device which may include a smartphone, a pollution sensor, a Global Positioning System (GPS) device, a microprocessor and proprietary software supported to a bicycle.

2 Claims, 7 Drawing Sheets

(56) References Cited

OTHER PUBLICATIONS

No patent novelty search was performed in this case and neither the Applicant nor the undersigned are aware of any prior art devices or documents which they believe to be material to the invention as claimed. This document is being supplied for informational purposes to the Examiner and is evidence of our desire to comply with the duty of disclosure.

* cited by examiner

BICYCLE ACTIVITY MONITORING AND RECORDING DEVICE WITH AIR POLLUTION SENSORS

This application claims the benefit of priority under 35 U.S.C. §119(e) of U.S. Provisional Patent Application Ser. No. 62/011,258, filed Jun. 12, 2014, the disclosure of which is incorporated herein by reference in its entirety and the benefit of priority under 35 U.S.C. 120 as a continuation-in-part of U.S. patent application Ser. No. 14/247,346 filed on Apr. 8, 2014.

I. BACKGROUND

A. Technical Field

This invention generally relates to bicycles and more specifically to methods and apparatuses related to bicycle activity monitoring and recording.

B. Description of Related Art

Bicycles and other manually propelled vehicles are well known. It is known to provide bicycles with speedometers that indicate the speed of the bicycle. It is also known to manually monitor and record activities related to a bicycle ride, such as distance traveled and time spent during the ride.

What is needed is a device that can automatically monitor and record activities related to bicycling along with environmental and atmospheric data including data related to air pollution.

II. SUMMARY

In one embodiment, an activity monitoring and recording device associated with a manually propelled bicycle is provided which comprises a body; at least one or more wheels that: (1) are rotatably supported to the body so that said wheels are rotatable with respect to the body; (2) have ground engaging surfaces that engage a ground surface as the bicycle is propelled over said ground surface; and (3) are thereby rotated with respect to the body through the use of pedals rotated by the rider's feet and legs; and, a hand engaging surface that is supported to the body upon which a rider's hands may contact; a seat supported on the body upon which a rider may be supported; the activity monitoring and recording device comprising: a pollution sensor that senses a pollution level; a microprocessor; software; wherein the microprocessor receives pollution data from the pollution sensor, processes the pollution data and generates an output to the rider through use of the software.

Also provided is a method of using an activity monitoring and recording device associated with a manually propelled bicycle comprising attaching a smartphone to the manually propelled bicycle by inserting the smartphone within a smartphone cradle attached to the manually propelled bicycle; attaching a base unit to the manually propelled bicycle by inserting the base unit within a base unit cradle attached to the manually propelled bicycle; attaching a magnet to a wheel on the manually propelled bicycle; attaching a pollution sensor to the manually propelled bicycle; powering on the smartphone, the base unit and the pollution sensor to retrieve pollution data; riding the manually propelled bicycle; accessing a software application programmed on the smartphone continually or as desired to monitor desired information related to pollution data; generating a pollution map on the smartphone software application based on the pollution data retrieved from the pollution sensor; and obtaining a recommended trail to follow on the smartphone software application based on the pollution data retrieved from the pollution sensor.

According to another aspect of this invention, an activity monitoring and recording device may be used with a manually propelled bicycle that includes: a body; first and second wheels that: (1) are rotatably supported to the body so that the wheels are rotatable with respect to the body; (2) have ground engaging surfaces that engage a ground surface as the bicycle is propelled over the ground surface and the wheels are thereby rotated with respect to the body; and, a handle bar that is supported to the body. The activity monitoring and recording device may comprise: a first magnet that: (1) is supportable to the first wheel; and, (2) is rotatable with the first wheel when the first wheel is rotated with respect to the body; a conductive surface that: (1) is supportable to the handle bar; (2) determines heartbeat data of a rider when a hand of the rider contacts the conductive surface while the rider manually propels the bicycle during a first ride; and, (3) transmits the heartbeat data; a smartphone that: (1) comprises a smartphone microprocessor; (2) comprises a Global Positioning System (GPS) device; and, (3) comprises a display screen; a base unit that: (1) comprises a base unit microprocessor; (2) comprises a hall effect sensor; and, (3) comprises software that can determine speeds of the bicycle during the first ride based on data from the hall effect sensor and the first magnet; a first cradle that supports the smartphone to the handle bar; a second cradle that supports the base unit to the body juxtaposed to the first magnet at least once per revolution of the first wheel; wherein the smartphone communicates with the base unit; wherein at least one of the smartphone microprocessor and the base unit microprocessor: (1) can determine a distance travelled by the bicycle during the first ride based on data from the GPS device; (2) can determine an average speed of the first ride; (3) is accessible to receive imputed information regarding a profile of the rider and information regarding a profile of the bicycle; (4) can determine calories burned by the rider during the first ride based on the heartbeat data, the rider's profile, the bicycle's profile, the distance travelled during the first ride, and the average speed of the first ride; and, (5) comprises computer memory that can store: (a) the speeds of the bicycle during the first ride; (b) the distance traveled during the first ride; (c) the average speed of the first ride; (d) the imputed information regarding the rider's profile; (e) the imputed information regarding the bicycle's profile; (f) the heartbeat data transmitted to the base unit; and, (g) the calories burned by the rider during the first ride; and, wherein the smartphone display screen displays to the rider during the first ride: the imputed information regarding the profile of the rider; the information regarding the profile of the bicycle; data provided by the GPS device; and at least one of: (1) the speeds of the bicycle during the first ride; (2) the distance travelled by the bicycle during the first ride; (3) the average speed of the first ride; and, (4) the calories burned by the rider during the first ride.

According to another aspect of this invention, the activity monitoring and recording device may comprise: a thermal sensor; and, an altitude sensor. At least one of the smartphone microprocessor and the base unit microprocessor: (1) can determine atmospheric temperatures during the first ride; (2) can determine altitudes of the bicycle during the first ride; (3) can determine calories burned by the rider during the first ride based on the atmospheric temperatures and the altitudes; and (4) can determine the pollution levels at varying altitudes and atmospheric conditions. The computer memory can store: (1) the atmospheric temperatures; and, (2) the altitudes; and, the smartphone display screen displays to the rider during the first ride: (1) the atmospheric temperatures; (2) the altitudes; and (3) the pollution level.

According to another aspect of this invention, the smartphone display screen displays to the rider during the first ride: the speeds of the bicycle during the first ride; the distance travelled by the bicycle during the first ride; the average speed of the first ride; and, the calories burned by the rider during the first ride.

According to another aspect of this invention, the conductive surface determines heartbeat data of the rider when the hand of the rider contacts the conductive surface while the rider manually propels the bicycle during a second ride; at least one of the smartphone microprocessor and the base unit microprocessor: (1) can determine a distance travelled by the bicycle during the second ride based on data from the GPS device; (2) can determine an average speed of the second ride; (3) can determine calories burned by the rider during the second ride based on the heartbeat data, the rider's profile, the bicycle's profile, the distance travelled during the second ride, and the average speed of the second ride; (4) can determine atmospheric temperatures during the second ride; (5) can determine altitudes of the bicycle during the second ride; and, (6) computer memory can store: (a) the speeds of the bicycle during the second ride; (b) the distance traveled during the second ride; (c) the average speed of the second ride; (d) the atmospheric temperatures during the second ride; (e) the altitudes during the second ride; and, (d) the calories burned by the rider during the second ride; and, the smartphone display screen displays to the rider during the second ride: (1) the imputed information regarding the profile of the rider; (2) the information regarding the profile of the bicycle; (3) data provided by the GPS device during the second ride; (4) the speeds of the bicycle during the second ride; (5) the distance travelled by the bicycle during the second ride; (6) the average speed of the second ride; (7) the atmospheric temperatures during the second ride; (8) the altitudes during the second ride; and, (9) the calories burned by the rider during the second ride.

According to another aspect of this invention, the conductive surface is part of an elastic grip that is attachable to the handle bar of the bicycle and to the second bicycle; and, a battery powered transmitter is positioned within the elastic grip and transmits the heartbeat data to at least one of the smartphone and the base unit.

According to another aspect of this invention, the smartphone and the base unit comprises between them: (1) a Bluetooth communication port; (2) a Universal Serial Bus (USB) interface; and (3) a Wi-Fi communication port.

According to another aspect of this invention, the base unit can transfer data related to at least one of the first ride and the second ride to at least one of: a tablet computer, a laptop computer, another smartphone and a desktop computer.

According to another aspect of this invention, the base unit can transfer the data related to at least one of the first ride and the second ride via a wired connection and wirelessly.

According to another aspect of this invention, the activity monitoring and recording device can record various types of physiological data, such as heartbeat, body temperature, and blood pressure of various riders from any third party device. The activity monitoring and recording device may also record the environmental and atmospheric data, such as wind speed and humidity from any third party device through a wired or wireless connection between the base unit, the smartphone and the third party device.

One advantage of this invention, according to some embodiments of this invention, is that numerous bicycle activities can be automatically monitored and recorded.

Another advantage of this invention, according to some embodiments of this invention, is that bicycle activity information can be stored for numerous riders and numerous bikes.

Still another advantage of this invention, according to some embodiments of this invention, is that the inventive device can be accessed using an electronic device, any smartphone, tablet computer and personal computer to provide inputted information regarding rider profile(s) and/or vehicle profile(s).

Other benefits and advantages of this invention will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION

Figure 1:
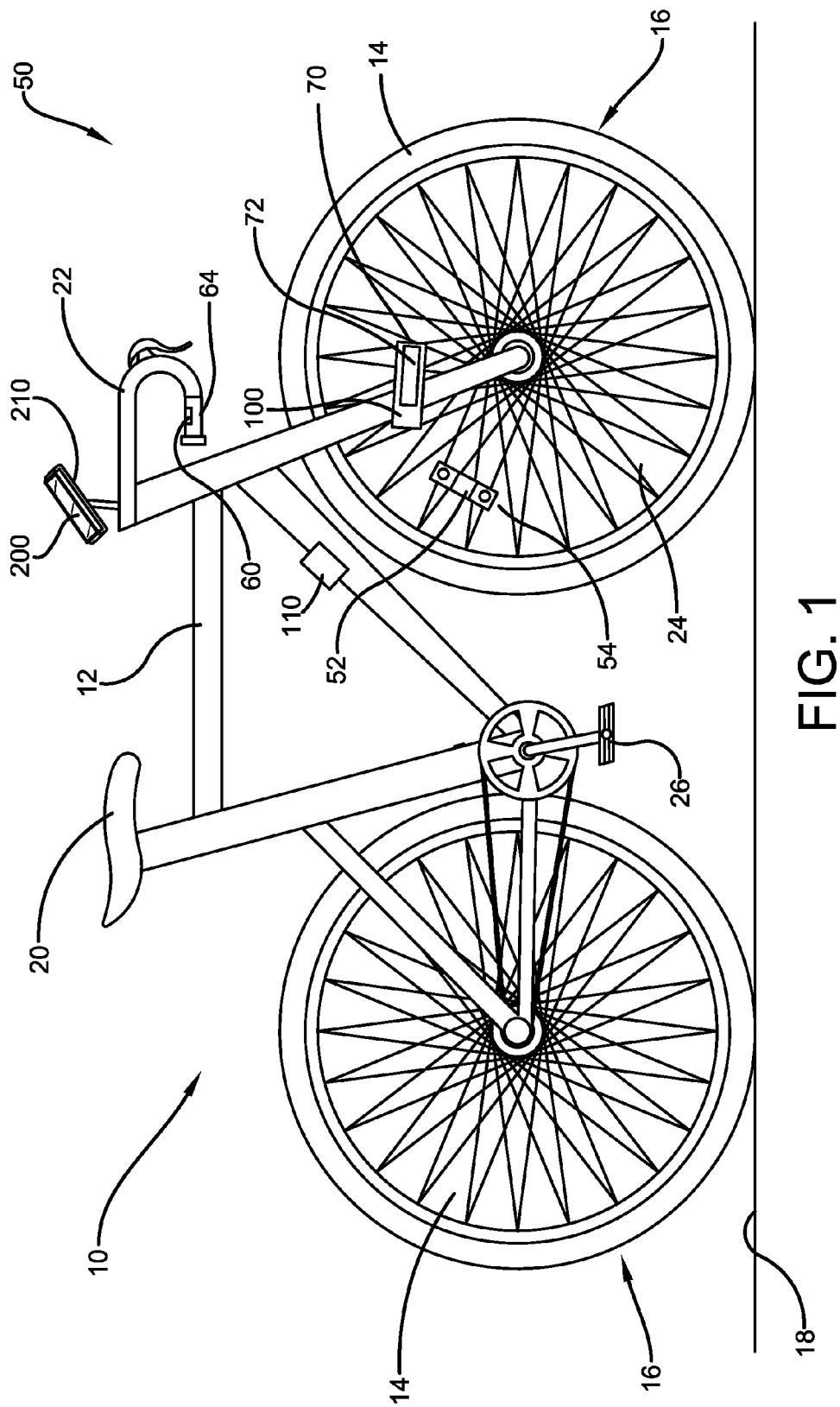
FIG. 1 is a side view of a bicycle that has an activity monitoring and recording device according so some embodiments of this invention.

Referring now to the drawings wherein the showings are for purposes of illustrating embodiments of the invention only and not for purposes of limiting the same, and wherein like reference numerals are understood to refer to like components, FIG. 1 shows a manually propelled vehicle 10 which might be used with a smartphone 200 and an activity monitoring and recording device 50 according to some embodiments of this invention. By manually propelled vehicle it is meant any vehicle that can be propelled or driven by a man or woman's own physical power. One non-limiting example of manually propelling is via bicycle pedals 26 that are rotated by the rider's feet and legs as is well known to those of skill in the art. While the manually propelled vehicle shown is a bicycle, it should be understood that any manually propelled vehicle chosen with the sound judgment of a person of skill in the art can be used with this invention. Non-limiting examples of manually propelled vehicles include, unicycles, bicycles, tricycles, wagons, and go-carts. Further, the term "bicycle", as used herein, refers to manually propelled cycles having any number of wheels. The manually propelled vehicle 10 may include a body or frame 12 and at least one wheel 14, two shown, that is rotatably supported to the body 12 so that the wheel 14 is rotatable with respect to the body 12. Each wheel 14 may have a ground engaging surface 16 that engages a ground surface 18 as the vehicle 10 is propelled over the ground surface 18 and the wheel 14 is thereby rotated with respect to the body 12. The vehicle 10 may also have a seat 20 supported to the body 12 upon which a rider may be supported in a known manner. The vehicle 10 may also have a hand engaging surface 22 supported to the body 12 that the rider's hand(s) may contact. For the embodiment shown, the hand engaging surface 22 is a handle bar though any hand engaging surface chosen with the sound judgment of a person of skill in the art may be used with this invention.

Figure 2:
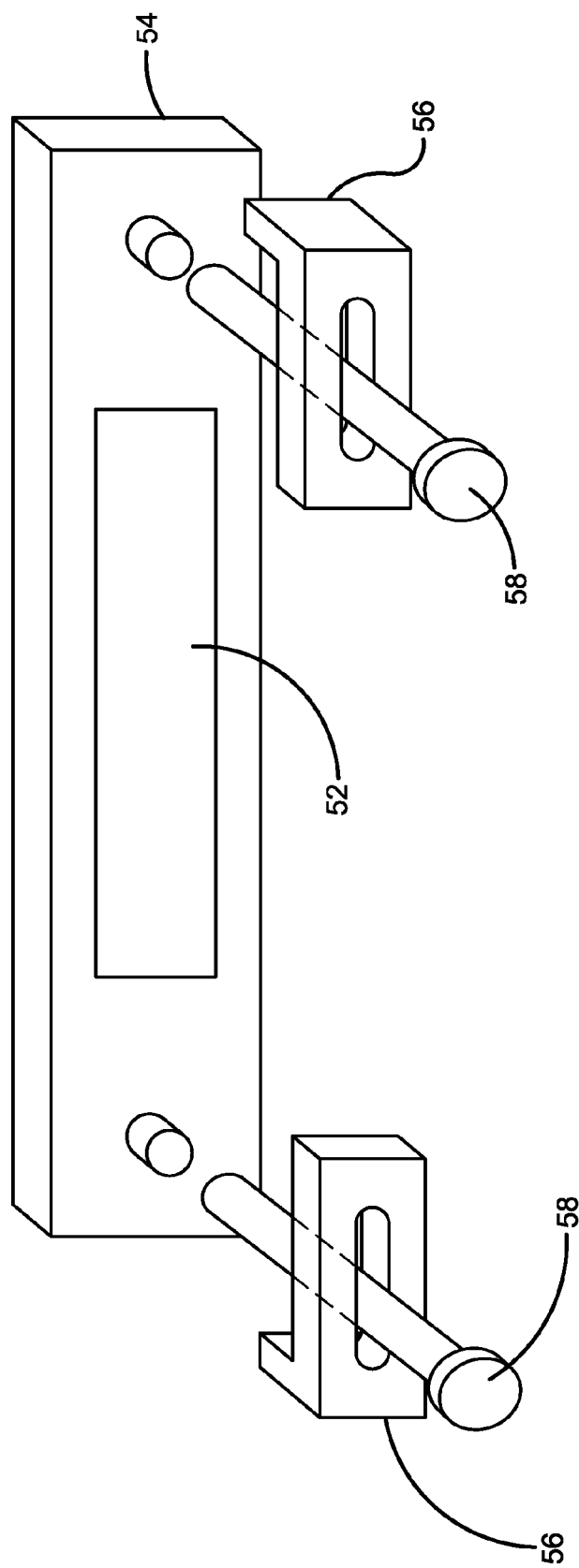
FIG. 2 is a perspective view of a magnet and magnet housing.

With reference now to FIGS. 1 and 2, the activity monitoring and recording device 50 may include a magnet 52 that is supportable to one of the wheels 14 and is rotatable with the wheel 14 when the wheel 14 is rotated with respect to the body 12. While the magnet 52 may be supported to the wheel 14 in any manner chosen with the sound judgment of a person of skill in the art, for the embodiment shown, the magnet 52 is positioned within a magnet housing 54. The housing 54 and magnet 52 are then supported to one or more wheel spokes 24 using one or more magnet brackets 56 and one or more connectors 58. The one or more connectors 58 may pass through openings in the one or more magnet brackets 56, between the spokes 24, and be received in one or more openings formed in the magnet housing 54, as shown.

Figure 3:
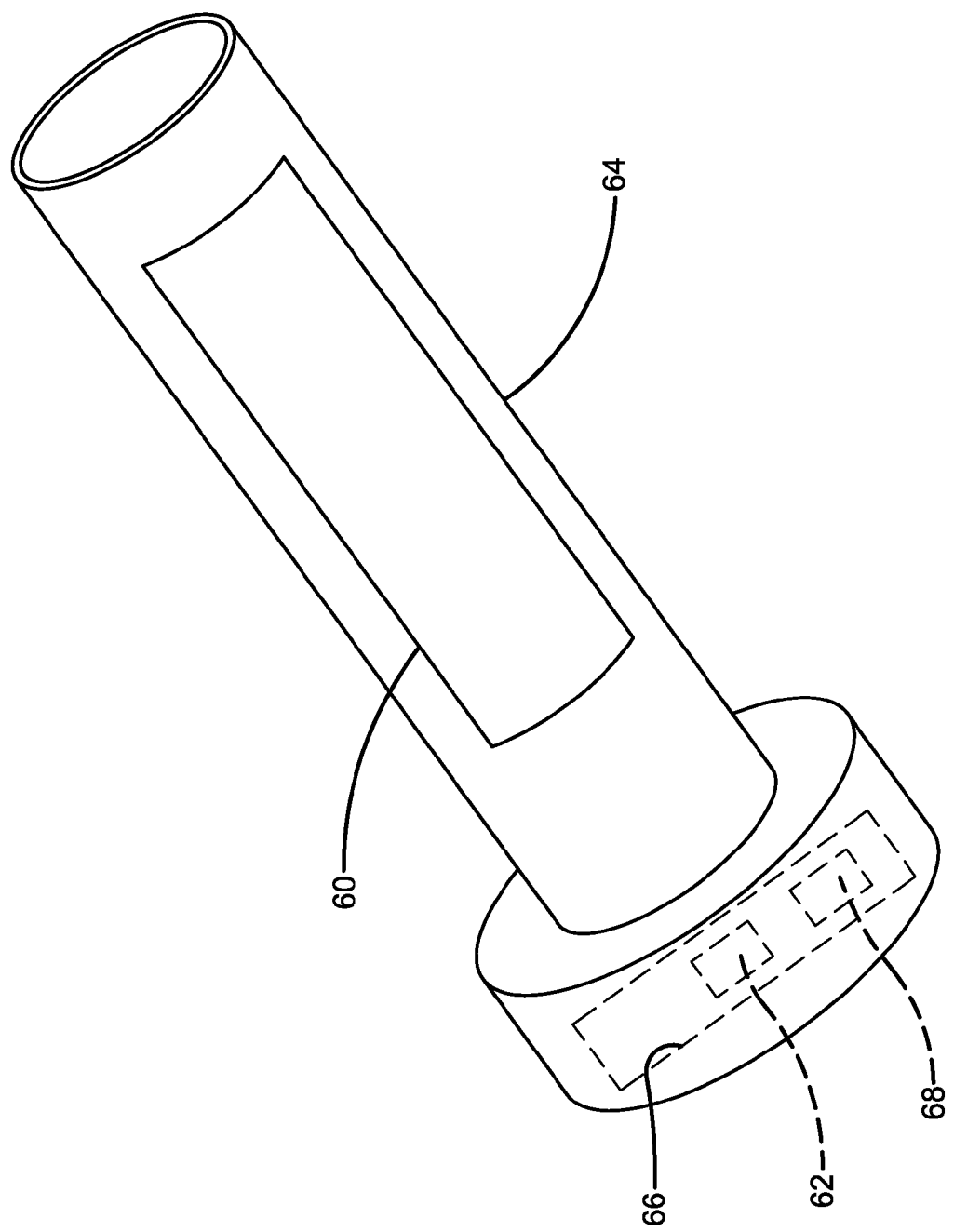
FIG. 3 is a perspective view of a conductive surface with an elastic grip.

With reference now to FIGS. 1 and 3, the activity monitoring and recording device 50 may include a conductive surface 60 that is supportable to the hand engaging surface 22 and that determines heartbeat data of the rider when a hand of the rider contacts the conductive surface 60 while the rider manually propels the vehicle during a ride. A transmitter 62 may be used to transmit the heartbeat data. In one embodiment, the transmitter 62 transmits data wirelessly. The conductive surface 60 may be supported to the hand engaging surface 22 in any manner chosen with the sound judgment of a person of skill in the art. For the embodiment shown, the conductive surface 60 is placed within an elastic grip 64 that has an opening that receives a portion of the hand engaging surface 22. The grip 64 may include a compartment 66 into which the transmitter 62 and a battery 68 may be positioned. The battery 68 may be used to power the conductive surface 60 and to power the transmitter 62 in a known manner. In one embodiment, the battery 68 may be rechargeable. The conductive surface 60 may sense the rider's heartbeat data when, for example, the rider's palm is placed onto the conductive surface 60.

Figure 4:
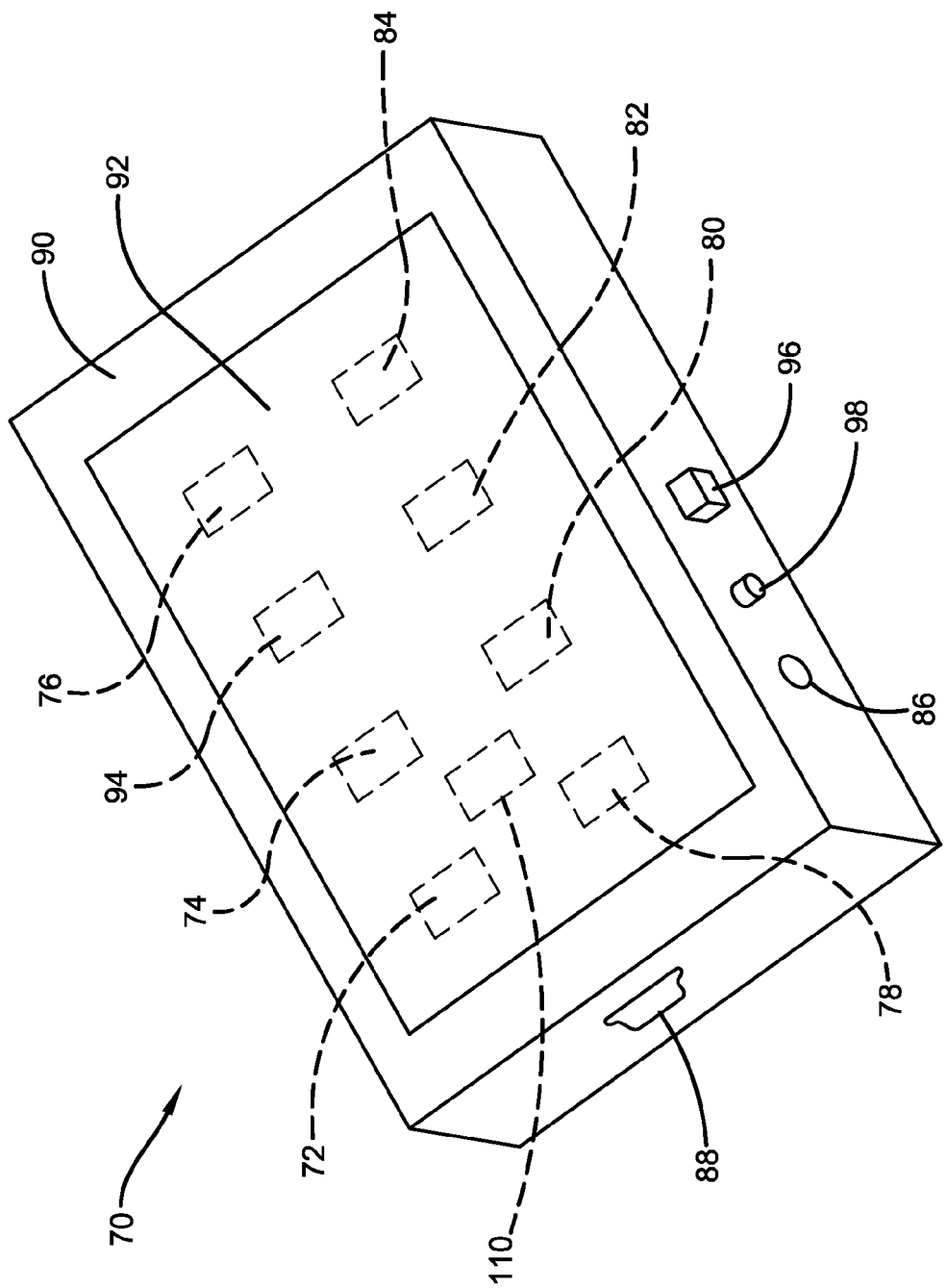
FIG. 4 is a perspective view of a base unit.

With reference now to FIGS. 1 and 4, the activity monitoring and recording device 50 may include a smartphone 200 and a base unit 70 that has a microprocessor 72, proprietary software 74 (which may also be provided on the smartphone 200) and a hall-effect sensor 76. The base unit 70 may be position so that the hall-effect sensor 76 is juxtaposed to the magnet 52 at least once per revolution of the wheel 14, as shown in FIG. 1. In this way the hall-effect sensor 74, magnet 52 and proprietary software 74 can be used to determine the speeds of the vehicle 10 during a ride based on the relevant magnetic fields. The proprietary software 74 may also be capable to determine the average speed of the vehicle 10 during a ride. The smartphone 200 and/or base unit 70 may have computer memory 78 that can store data of many types, including the rider's heartbeat data, the speeds of the vehicle 10 and the average speed of the vehicle 10. The smartphone 200 and/or base unit 70 may include a Global Positioned System (GPS) device 80 that works with a GPS to determine the location of the vehicle 10. The software 74 may use data from the GPS device 80 to determine the distance traveled by the vehicle during a ride and the memory 78 may store the location data and/or the distance traveled data.

With continuing reference to FIGS. 1 and 4, the smartphone 200 and/or base unit 70 may include or work with any sensor chosen with sound judgment of a person of skill in the art to monitor the vehicle 10 and/or the rider of the vehicle. In one embodiment, a thermal sensor 82 that senses the atmospheric temperature at the location of the vehicle 10 is used. In another embodiment, an altitude sensor 84 that senses the altitude of the vehicle 10 as it travels is used. The software 74 on the smartphone 200 and/or base unit may include memory 78 used to track and record the atmospheric temperatures and altitudes throughout a ride. This data may be used by the software 74 to determine/calculate any useful data as determined by a person of skill in the art, including but not limited to the calories burned by the rider during a ride and the pollution level at varying altitudes and atmospheric conditions.

Still referring to FIGS. 1 and 4, the proprietary software 74 on the smartphone 200 or base unit may be accessible by an electronic device to provide inputted information regarding a profile of one or more riders and inputted information regarding a profile of one or more vehicles. Non-limiting examples of rider profile information includes rider age, rider weight, rider sex, average heartbeat rate, ride begin times and end times, and ride dates. Non-limiting examples of vehicle profile information includes vehicle type, vehicle wheel size, and vehicle weight. Once inputted into the base unit 70, the profile information can be used by the software 74, along with the heartbeat data, to determine the calories burned by the rider during the ride. The memory 78 can store the profile data and thus the same profile data will not have to be inputted again but the software 74 can use the profile data for future determinations/calculations. The profile information may be inputted into the software 74 in any manner chosen with the sound judgment of a person of skill in the art. In one embodiment, the data is inputted wirelessly in a known manner. In another embodiment, the base unit 70 has a Bluetooth communication port 86 which can transmit information to the smartphone. In yet another embodiment, the base unit 70 has a Universal Serial Bus (USB) interface 88. The wireless, Bluetooth and USB communication devices can be used to send and receive any data chosen with the sound judgment of a person of skill in the art. The software 74 may be accessed to input data from a rider in any applicable manner, including but not limited to smartphones, tablet computers, lap top computers and desk top computers.

With continuing reference to FIGS. 1 and 4, the smartphone 200 may include a display screen which may be a touch screen. The base unit may include a housing 90 and a display screen 92 which may be a touch screen. In one embodiment, the display screen(s) may be used by the rider may for access. The smartphone 200 and/or base unit 70 may also have any operating components as chosen by a person of skill in the art. In one embodiment, the base unit 70 includes solar cells 94 so that the base unit 70 can be powered by solar energy. In an alternative embodiment, the base unit may be powered by a battery. A power on/off switch 96 may be provided so that the rider can easily turn the base unit 70 on and off. An LED indicator 98 may be provided to indicate the power status (on or off).

Figure 5:
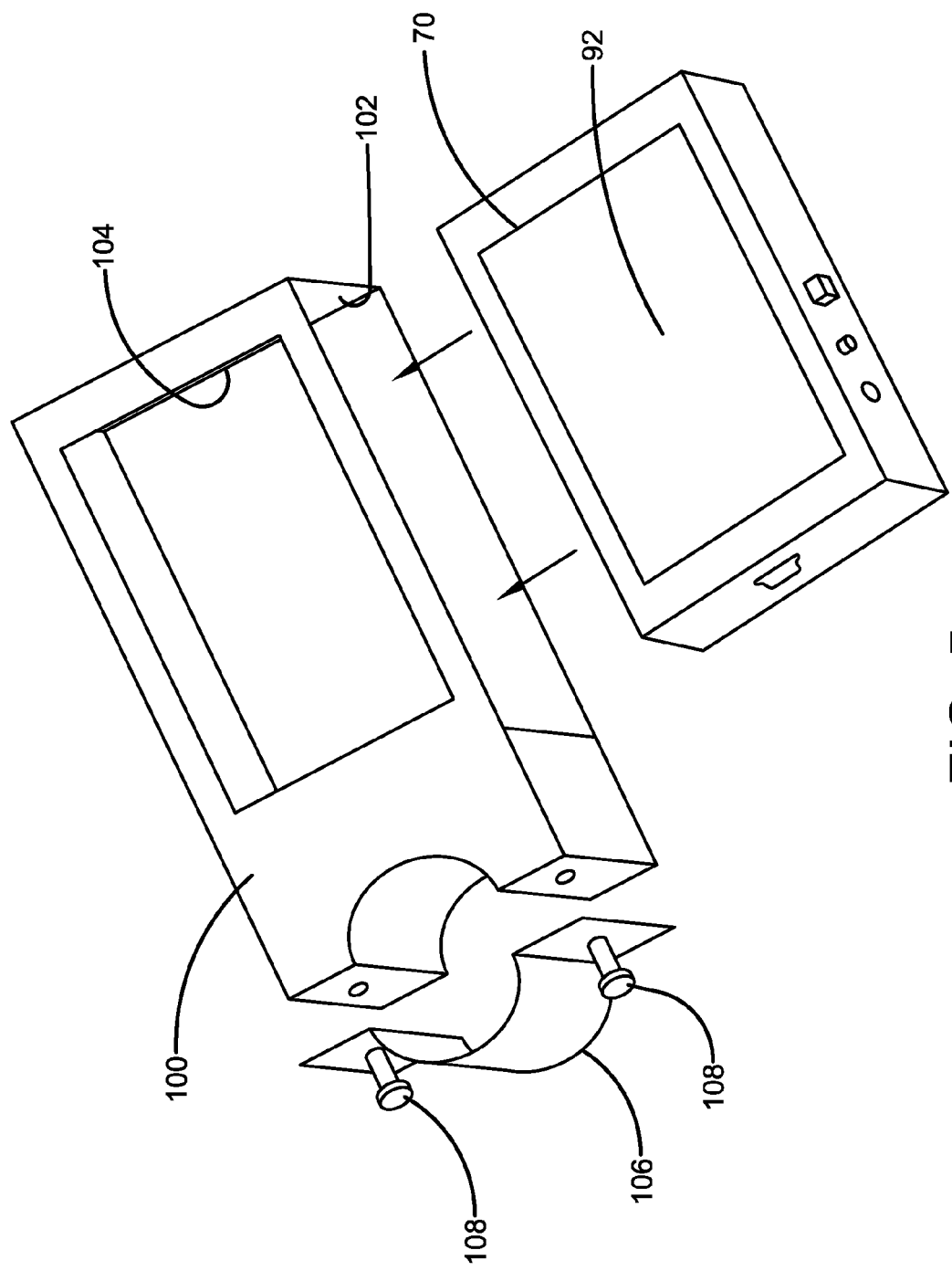
FIG. 5 is a perspective view of a base unit and cradle.

With reference now to FIGS. 1 and 5, to support the base unit 70 to the vehicle 10, a cradle 100 may be used. The cradle 100 may include a cavity 102 into which the base unit 70 may be inserted for protection during use. The cradle 100 may have an opening 104 through which the display screen 92 can be viewed when the base unit 70 is received within the cradle 100. The cradle 100 and base unit 70 may then be supported to the vehicle body 12 using one or more cradle brackets 106 and one or more connectors 108. The one or more connectors 108 may pass through openings in the one or more cradle brackets 56, around a portion of the body 12, such as the wheel fork, as shown, and be received in one or more openings formed in the cradle 100. Another cradle 210 may be used to support the smartphone 200 to the vehicle 10, such as to the handle bars.

With reference now to all the FIGURES, to use the activity monitoring and recording device 50 of this invention, the rider may attach a magnet 52 to a wheel 14 in a manner described above. If used, the rider may also attach the conductive surface 60 to the hand engaging surface 22 in a manner described above. The rider may input any desired profile information into the smartphone 200 and/or base unit 70 concerning the rider and/or the vehicle, as described above, and insert the base unit 70 within the cradle 100 and the smartphone 200 within its cradle 210. The rider may then attach the cradles, smartphone 200 and base unit 70 to the vehicle. Once the components are supported to the vehicle 10, the rider need only ride the vehicle. During the ride, the rider may access the smartphone 200 continually or as desired to monitor any desired information, such as burned calories. Once the ride is complete, the rider may access the base unit 70 to review any desired information it contains.

With continuing reference to all the FIGURES, it should be understood that this invention is useful for numerous vehicle, rides, and riders. A first rider, for example, may input his/her rider profile information into the smartphone 200 and/or base unit 70 just once and the memory 78 will store it. Similarly, the vehicle profile information for a first vehicle may be inputted into the smartphone 200 and/or base unit 70 just once. As a result, should the same first rider use the same first vehicle for a second ride, the rider and vehicle profile information will not have to be re-inputted (only changes to the original profile information will have to be inputted). This is very easy for the rider. The software 74 may then be able to calculate/determine comparative data between the first and second rides for the first rider—such as the calories burned during the rides. Should the same first rider then choose to ride a second vehicle, it is only necessary for the second vehicle to be equipped with the same magnet and conductive surface (or, if desired, another magnet and conductive surface). The first rider then only needs to input the profile information for the second vehicle into the same smartphone 200 or base unit and attach the same smartphone 200 and/or base unit to the second vehicle. At the conclusion of the third ride, the software may then be able to calculate/determine comparative data between the first, second and third rides for the first rider. Similarly, a second rider may use the same base unit with the same or other vehicles and will only need to input new profile information regarding the rider and/or vehicle. Once again, the software may then be able to calculate/determine comparative data between rides and riders. In another embodiment, fleets of riders and/or vehicles can be monitored. If desired, additional base units may also be used. In this case, different base units may be connected together in a known manner to permit data to be shared.

With reference now to FIGS. 1 and 4, in another application the activity monitoring and recording device 50 may include or work with one or more pollution sensors 110. While useful anywhere, the pollution sensors 110 may be especially useful in urban areas. The pollution sensor(s) 110 may, in one embodiment, be used to measure and record the pollution level during a ride. In another embodiment, the pollution sensor(s) 110 may be used to inform the rider(s) about the level of pollution. If the pollution level is higher than a recommended level—especially for heavy exercise like bike riding can be—the rider(s) may decide to delay the ride to another time or ride in another area. This feature may be used for anyone but may be especially useful for the elderly, children, persons with asthma, and/or anyone especially sensitive to the pollution level. In certain embodiments, the pollution sensor(s) may be powered by a battery, however, any alternative means for powering the pollution sensor within the ordinary skill of the art may be used, such as through the use solar powered cells.

Figure 7:
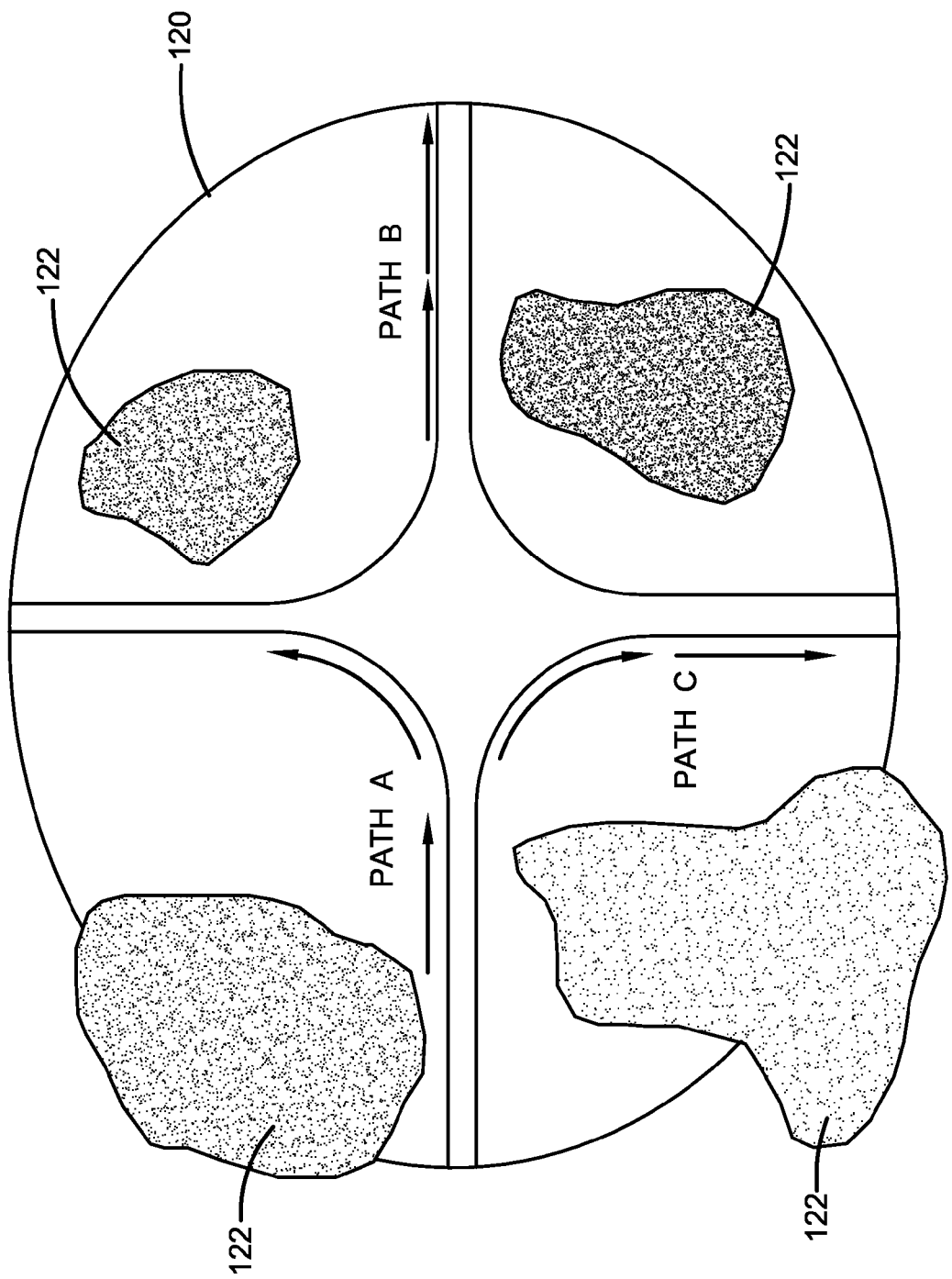
FIG. 7 illustrates a pollution map.

With continuing reference to FIGS. 1 and 4, in yet another embodiment, the activity monitoring and recording device 50 may be used to collect pollution level data from any number of sources—including but not limited to one or more pollution sensors 110 and/or one or more smartphones 200 and/or one or more base units 70 and/or one or more web sites such as, for a non-limiting example, government agency pollution websites. From this pollution data, a pollution level map may be created. The pollution level map may be provided in any location permitting access by the rider. One non-limiting location for the pollution level map is a website. The pollution level map may then be accessed from a rider's smartphone 200 and/or base unit 70 so that the rider can ride through "clean" (relatively lower levels of pollution) areas and avoid riding through "dangerous" (relatively higher level of pollution) areas. In a more specific embodiment, the smartphone 200 and/or base unit 70 may work with the Global Positioning System (GPS) device 80 to recommend a specific trail for a rider to follow. As a non-limiting example only, FIG. 7 illustrates a pollution map showing an area 120 within which a rider may want to ride. The dangerous (relatively higher level of pollution) areas are indicated with shaded areas 122. The shaded areas 122 illustrate varying levels of darkness or different shades to represent different levels of pollution within a given area. For example, a darker shaded area may represent an area of higher pollution than a lighter shaded area. In this case, the rider may avoid the shaded areas 122 when planning for and riding on a particular trail, for example by choosing to follow Path A, Path B or Path C.

With reference now to FIGS. 1 and 4, while the pollution sensors 110 used may be of any type chosen with the sound judgment of a person of skill in the art, in one embodiment the pollutions sensor(s) 110 is an air pollution sensor. Non-limiting examples of air pollution that may be sensed include: Carbon Monoxide (CO), Nitrogen Dioxide ($NO_2$), Sulfur Dioxide ($SO_2$), Trioxygen ($O_3$) and PM (Particulate Matter). If the pollution sensor 110 is part of the activity monitoring and recording device 50, it may be positioned in manner chosen with the sound judgment of a person of skill in the art. In one embodiment, the sensor(s) 110 may be part of the smartphone 200. In another embodiment, shown in FIG. 1, the sensor(s) 110 may be mounted to the vehicle 10. In yet another embodiment, shown in FIG. 4, the sensor(s) 110 may be part of the base unit 70.

Figure 6:
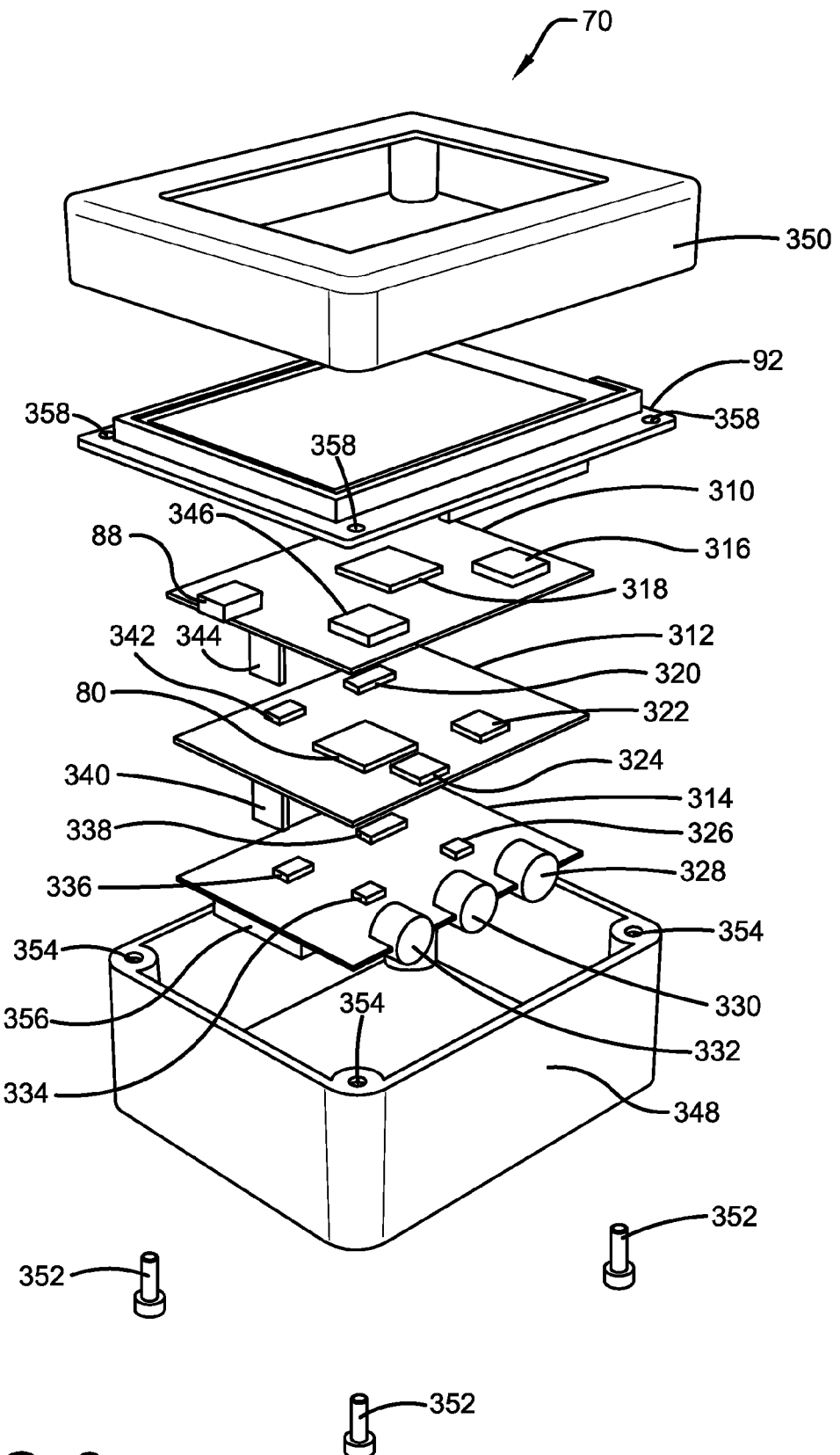
FIG. 6 is an exploded view of a base unit.

With reference now to FIG. 6, the base unit 70 is illustrated in an exploded view. The base unit 70 includes a housing 348 having apertures 354, through which fasteners (352) (e.g., screws, although any fastener known to those of ordinary skill in the art may be used) may be passed through to engage the housing 348 to an upper frame covering 350. An air pollution sensor board 314 is first included within the housing 348. The air pollution sensor board 314 includes a CO sensor 328, a $NO_2$ sensor 330 and a $SO_2$ sensor 332. Also included within the air pollution sensor board 314 are two analog to digital pollution sensor converters 326 and 334, a serial communication interface 336 and an air pollution processor 338. The air pollution sensor board 314 also includes a battery 356. Also included within the housing 348 is a sensor board 312. The sensor board 312 includes a temperature sensor 320, a heartbeat sensor 322, a GPS antenna 324, a GPS device or module 80 and a GPS power supply 342. The sensor board 312 also includes a power and serial connector 340 which is capable of connecting the sensor board 312 to the battery 356. Also included within the housing 348 is a processor board 310. The processor board 310 includes a memory chip 316, a central processing unit (CPU) 318, a wireless communication Wi-Fi/Bluetooth 346, and a USB interface 88. The processor board 310 also includes a power and serial connector 344 which is capable of connecting the processor board 310 to the battery 356. The housing 348 also includes a display screen 92 (e.g., an LCD display screen, although any display screen known to those of ordinary skill in the art may be used) which is positioned over the processor board 312, the sensor board 314 and the air pollution sensor board 316. The base unit 70 also includes a frame covering 350 which is positioned over the display screen 92 and engaged to the housing 348 through fasteners 352. In certain embodiments, the display screen 92 may include threaded apertures 358 through which fasteners 352 may pass through to engage the display screen 92 to the housing 348 and the frame covering 350.

In certain embodiments, the smartphone may receive pollution data from the pollution sensor through a wireless communication port between the pollution sensor and the smartphone. In alternative embodiments, the activity monitoring and recording device may include a base unit, wherein the base unit receives pollution data from the pollution sensor through a wireless communication port between the pollution sensor and the base unit. The base unit may include a base unit microprocessor and a base unit software application for processing the pollution data received from the pollution sensor and generating an output through use of the base unit software application. The pollution sensor may incorporated as a component within the base unit or may be separate from said base unit. In embodiments where the pollution sensor is separate from the base unit, the pollution sensor may communicate with the base unit through a wireless communication port between the pollution sensor and the base unit. The base unit may then transmit the processed pollution data to a smartphone through a wireless communication port between said base unit and said smartphone.

In alternative embodiments, at least one of the base unit and the smartphone may transmit the pollution data received from the pollution sensor to a wireless transmission tower, which in turn, transmits the pollution data to a web server which allows the pollution data to be processed for display on at least one website. A user's smartphone may then access the processed pollution data from the one or more websites for display on the smartphone.

In certain embodiments, the smartphone may include a software application capable of generating a pollution map based on measured pollution data. In other embodiments, the website which receives and processes the pollution data may include a software application capable of generating a pollution map.

In further embodiments, the smartphone and/or the base unit in conjunction with the Global Positioning System (GPS) device may generate and display a recommended trail for the rider to follow within a pollution map.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof. The phrase "associated with" as used in this document, refers to structures which support the disclosed device and may also refer to structures not disclosed herein capable of supporting the disclosed device. Further, the "invention" as that term is used in this document is what is claimed in the claims of this document. The right to claim elements and/or sub-combinations that are disclosed herein as other inventions in other patent documents is hereby unconditionally reserved.

Having thus described the invention, it is now claimed:

1. An activity monitoring and recording device associated with a manually propelled bicycle comprising:
   a body;
   at least one or more wheels that:
      (1) are rotatably supported to said body so that said wheels are rotatable with respect to said body;
      (2) have ground engaging surfaces that engage a ground surface as said bicycle is propelled over said ground surface; and
      (3) said wheels are thereby rotated with respect to said body through the use of pedals rotated by the rider's feet and legs; and, a hand engaging surface that is supported to said body upon which a rider's hands may contact;
   a seat supported on said body upon which a rider may be supported;
   said activity monitoring and recording device comprising:
      a pollution sensor that senses a pollution level;
      a microprocessor;
      software;
      wherein said microprocessor receives pollution data from said pollution sensor, processes said pollution data and generates an output to the rider through use of the software;
   wherein said hand engaging surface is a handle bar;
   wherein said activity monitoring and recording device is engaged with the associated bicycle;
   said activity monitoring and recording device further comprising,
      a smartphone having
         a smartphone microprocessor,
         a Global Positioning System (GPS) device,
         a smartphone software application, and
         a display screen;
      a first cradle that supports said smartphone to said handle bar;
      a magnet engaged with a wheel of said bicycle;
      a base unit having
         a base unit microprocessor,
         a first base unit software application,
         a hall effect sensor, and
         software that can determine speeds of said bicycle during a first, second and subsequent rides based on data from said hall effect sensor and said magnet;
      a second cradle that supports said base unit to said body juxtaposed to said magnet at least once per revolution of said wheel;
      an elastic grip having
         a conductive surface adapted to sense the heartbeat data of a rider when contacted by the rider's hand, and
         a wireless transmitter adapted to transmit the heartbeat data;

a pollution sensor adapted to sense a pollution level;
wherein said base unit is adapted to receive pollution data from said pollution sensor through a wireless communication port between said pollution sensor and said base unit;
wherein said base unit microprocessor and said first base unit software application are adapted to process said pollution data received from said pollution sensor, generate an output, and transmit the output to at least one smartphone supported on the bicycle through use of said base unit software application;
wherein said at least one smartphone is adapted to receive said output from said base unit through a wireless communication port between said base unit and said at least one smartphone;
wherein said at least one smartphone microprocessor, Global Positioning System (GPS) device, and smartphone software application, are adapted to generate a pollution map based on said output transmitted from said base unit;
wherein said at least one smartphone software application is adapted to generate a recommended trail for at least one rider to follow on said display screen based on said pollution data retrieved from said pollution sensor;
wherein said smartphone and said base unit comprise between them a Universal Serial Bus (USB) interface, wherein at least one of said smartphone and said base unit are adapted to transfer data related to at least one of said first, second and subsequent rides to at least one of: a tablet computer, a laptop computer, another smartphone, a desk top computer and a cloud;
wherein said activity monitoring and recording device is adapted to record various types of physiological data of various riders from any third party device; and,
wherein said activity monitoring and recording device is adapted to record environmental and atmospheric data from any third party device, wherein said smartphone is adapted to communicate with said third party device data via a wired or wireless connection;
wherein at least one of said smartphone microprocessor and said base unit microprocessor,
 (1) determines a distance travelled by said bicycle during at least one of said first, second and subsequent rides based at least in part on data from said GPS device,
 (2) determines an average speed of at least one of said first, second and subsequent rides,
 (3) receives imputed information regarding a profile of said rider and information regarding a profile of said bicycle,
 (4) determines calories burned by said rider during at least one of said first, second and subsequent rides based on said heartbeat data, said rider's profile, said bicycle's profile, said distance travelled during said first, second and subsequent rides, and said average speed of said first, second and subsequent rides, and,
 (5) comprises computer memory that is adapted to store
  (a) said speed of at least one of said first, second and subsequent rides,
  (b) said distance traveled during at least one of said first, second and subsequent rides,
  (c) said average speed of at least one of said first, second and subsequent rides,
  (d) said imputed information regarding said rider's profile,
  (e) said imputed information regarding said bicycle's profile,
  (f) said heartbeat data transmitted to said base unit, and,
  (g) said calories burned by said rider during at least one of said first, second and subsequent rides;
 wherein said smartphone display screen is adapted to display, during said first, second and subsequent rides, at least one of
  said imputed information regarding said profile of said rider,
  said information regarding said profile of said bicycle,
  data provided by said GPS device, and
  said speeds of said bicycle during said first, second and subsequent rides,
  said distance travelled by said bicycle during said first, second and subsequent rides,
  said average speed of said first, second and subsequent rides, and,
  said calories burned by said rider during said first, second and subsequent rides; and
 wherein the activity monitoring and recording device further has
  a thermal sensor, and
  an altitude sensor,
  wherein at least one of said smartphone microprocessor and said base unit microprocessor,
   (1) determines atmospheric temperatures during said first, second and subsequent rides,
   (2) determines altitude of said bicycle during at least one of said first, second and subsequent rides,
   (3) determines calories burned by said rider during said first, second and subsequent rides based on said atmospheric temperatures and said altitudes, and
   (4) can determine said pollution level at varying altitudes and atmospheric temperatures,
  wherein said computer memory stores
   (1) said atmospheric temperatures, and,
   (2) said altitudes, and,
  wherein said smartphone display screen displays
   (1) said atmospheric temperatures,
   (2) said altitudes, and
   (3) said pollution level.

2. The activity monitoring and recording device of claim 1, wherein the pollution sensor is an air pollution sensor capable of sensing at least one of carbon monoxide (CO), sulfur dioxide ($SO_2$), trioxygen ($O_3$) and particulate matter.

* * * * *